(12) United States Patent
Jiang et al.

(10) Patent No.: US 9,059,760 B2
(45) Date of Patent: Jun. 16, 2015

(54) APPARATUS AND METHOD FOR ENABLING UPLINK BEAMFORMING TRANSIT DIVERSITY

(75) Inventors: Yibo Jiang, San Diego, CA (US); Sharad Deepak Sambhwani, San Diego, CA (US); Jilei Hou, San Diego, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/019,448

(22) Filed: Feb. 2, 2011

(65) Prior Publication Data

US 2011/0194637 A1  Aug. 11, 2011

Related U.S. Application Data

(60) Provisional application No. 61/302,056, filed on Feb. 5, 2010.

(51) Int. Cl.
*H04B 7/02* (2006.01)
*H04L 1/02* (2006.01)
(Continued)

(52) U.S. Cl.
CPC ............ *H04B 7/0617* (2013.01); *H04B 7/0634* (2013.01); *H04W 52/146* (2013.01); *H04W 52/325* (2013.01)

(58) Field of Classification Search
CPC .. H04B 7/0617; H04B 7/0404; H04B 7/0413; H04B 7/0634; H04L 25/0204

USPC .......... 370/342, 516, 519, 329; 375/315, 329, 375/299, 147, 350, 267; 455/69, 101, 90.2, 455/512, 500, 561, 562.1; 342/373, 377
See application file for complete search history.

(56) References Cited

U.S. PATENT DOCUMENTS 6,470,001 B1 * 10/2002 Kim et al. ...................... 370/342
6,477,161 B1 * 11/2002 Hudson et al. ................ 370/342
(Continued)

FOREIGN PATENT DOCUMENTS

EP          2262307 A1    12/2010
JP       2009111995 A     5/2009
(Continued)

OTHER PUBLICATIONS

"3rd Generation Partnerships Project; Technical Specification Group Radio Access Network; Physical layer procedures (FDD) (Release 8)", 3GPP Standard; 3GPP TS 25.214, $3^{rd}$ Generation Partnership Project (3GPP), Dec. 2008(Dec. 1, 2008), No. V8.4.0, pp. 1-92.*
(Continued)

*Primary Examiner* — Daniel Washburn
*Assistant Examiner* — Amneet Singh
(74) *Attorney, Agent, or Firm* — Darren M. Simon

(57) ABSTRACT

A method and apparatus for enabling uplink beamforming transmit diversity is provided. The method may include receiving, by a wireless communications device (WCD), a beamforming weight vector in response to transmission by the WCD of two or more pilot channels, applying the received beamforming weight vector to at least one of a first of the two or more pilot channels, one or more data channels, or one or more control channels, and transmitting, using two or more antennas, at least one of the one or more data channels or at least one of the one or more control channels, wherein the number of pilot channels is greater than or equal to the number of antennas.

85 Claims, 11 Drawing Sheets

(51) Int. Cl.
*H04B 7/06* (2006.01)
*H04W 52/14* (2009.01)
*H04W 52/32* (2009.01)

(56) References Cited

U.S. PATENT DOCUMENTS

| | | | | |
|---|---|---|---|---|
| 6,694,155 | B1* | 2/2004 | Chin et al. | 455/562.1 |
| 6,982,971 | B2* | 1/2006 | Tiedemann et al. | 370/333 |
| 7,782,755 | B2* | 8/2010 | Yu | 370/208 |
| 7,809,074 | B2* | 10/2010 | Kotecha et al. | 375/267 |
| 7,825,856 | B2* | 11/2010 | Na et al. | 342/373 |
| 8,054,905 | B2* | 11/2011 | Shnaider et al. | 375/267 |
| 8,553,795 | B2 | 10/2013 | Xu et al. | |
| 8,559,990 | B2 | 10/2013 | Jiang et al. | |
| 2004/0001554 | A1* | 1/2004 | Sun et al. | 375/260 |
| 2004/0095907 | A1* | 5/2004 | Agee et al. | 370/334 |
| 2007/0064775 | A1* | 3/2007 | Petre et al. | 375/147 |
| 2007/0092019 | A1* | 4/2007 | Kotecha et al. | 375/267 |
| 2007/0099571 | A1* | 5/2007 | Withers et al. | 455/67.11 |
| 2007/0099578 | A1* | 5/2007 | Adeney et al. | 455/69 |
| 2007/0189404 | A1* | 8/2007 | Baum et al. | 375/260 |
| 2007/0206626 | A1* | 9/2007 | Lee et al. | 370/437 |
| 2008/0089450 | A1* | 4/2008 | Zelst et al. | 375/344 |
| 2008/0232240 | A1* | 9/2008 | Baum et al. | 370/210 |
| 2008/0267056 | A1* | 10/2008 | Aryanfar et al. | 370/203 |
| 2008/0311858 | A1* | 12/2008 | Cheng et al. | 455/69 |
| 2009/0042618 | A1* | 2/2009 | Hedayat et al. | 455/562.1 |
| 2009/0046569 | A1* | 2/2009 | Chen et al. | 370/203 |
| 2009/0082052 | A1 | 3/2009 | Bhushan et al. | |
| 2009/0160707 | A1* | 6/2009 | Lakkis | 342/367 |
| 2009/0190681 | A1 | 7/2009 | Moulsley et al. | |
| 2009/0190688 | A1* | 7/2009 | Kotecha et al. | 375/267 |
| 2009/0239565 | A1* | 9/2009 | Han et al. | 455/512 |
| 2009/0252250 | A1* | 10/2009 | Heath et al. | 375/267 |
| 2009/0252251 | A1* | 10/2009 | Tosato et al. | 375/267 |
| 2009/0270118 | A1* | 10/2009 | Jin et al. | 455/517 |
| 2009/0310693 | A1* | 12/2009 | Baker et al. | 375/260 |
| 2009/0323847 | A1* | 12/2009 | Na et al. | 375/267 |
| 2010/0002800 | A1* | 1/2010 | Kim et al. | 375/295 |
| 2010/0008445 | A1 | 1/2010 | Khan | |
| 2010/0103877 | A1 | 4/2010 | Wang et al. | |
| 2010/0120419 | A1 | 5/2010 | Zheng et al. | |
| 2010/0158151 | A1* | 6/2010 | Krauss et al. | 375/267 |
| 2010/0177741 | A1* | 7/2010 | Zhang et al. | 370/335 |
| 2010/0220811 | A1* | 9/2010 | Semenov et al. | 375/296 |
| 2010/0234011 | A1* | 9/2010 | Baker et al. | 455/422.1 |
| 2010/0246711 | A1 | 9/2010 | Kishigami et al. | |
| 2011/0044376 | A1* | 2/2011 | Lin et al. | 375/130 |
| 2011/0045792 | A1* | 2/2011 | Na et al. | 455/272 |
| 2011/0064018 | A1* | 3/2011 | Hottinen | 370/315 |
| 2011/0105174 | A1* | 5/2011 | Pelletier et al. | 455/522 |
| 2011/0194637 | A1* | 8/2011 | Jiang et al. | 375/267 |

FOREIGN PATENT DOCUMENTS

| | | |
|---|---|---|
| WO | 2008117401 A1 | 10/2008 |
| WO | 2009122658 A1 | 10/2009 |
| WO | 2011097507 | 8/2011 |

OTHER PUBLICATIONS

"3rd Generation Partnerships Project; Technical Specification Group Radio Access Network; Physical layer procedures (FDD) (Release 8)", 3GPP Standard; 3GPP TS 25.214, 3rd Generation Partnership Project (3GPP), Dec. 2008(Dec. 1, 2008), No. V8.4.0, pp. 1-92.*
Yao Ma, Leith, A., Alouini, M.-S. and Xuemin Shen, "Weighted-SNR-Based Fair Scheduling for Uplink OFDMA," Global Telecommunications Conference, 2009. GLOBECOM 2009. IEEE, Nov. 30, 2009-Dec. 4, 2009, pp. 1-6.*
R.M. Radaydeh, "SNR and SINR-based selection combining algorithms in the presence of arbitrarily distributed co-channel interferers" IET Communications, 2009, vol. 3, Iss. 1, pp. 57-66.*
Vrigneau, B., Brest Letessier, J., Rostaing, P., Collin, L. and Burel, G., "Statistical comparison between max-dmin, max-SNR and MMSE precoders," Signals, Systems and Computers, 2006. ACSSC '06, Oct. 29, 2006-Nov. 1, 2006, pp. 1611-1614.*
3rd Generation Partnership Project; Technical Specification Group Radio Access Network; Physical layer procedures (FDD) (Release 8), 3GPP Standard; 3GPP TS 25.214, 3RD Generation Partnership Project (3GPP), Mobile Competence Centre; 650, Route Des Lucioles; F-06921 Sophia-Antipolis Cedex; France, No. V8.4.0, Dec. 1, 2008, pp. 1-92, XP050366889.
Huawei: "Adaptation of the number of DRS/SRS antenna ports for UL", 3GPP Draft; R1-091276-Adaptation of the Number of DRS_SRS Antenna Ports for UL, 3rd Generation Partnership Project (3GPP), Mobile Competence Centre; 650, Route Des Lucioles; F-06921 Sophia-Antipolis Cedex; France, No. Seoul, Korea; Mar. 17, 2009, XP050338884, [retrieved on Mar. 17, 2009].
International Search Report and Written Opinion—PCT/US2011/023735—ISA/EPO—Apr. 26, 2011.
Motorola: "Uplink SU-MIMO Design Options for LTE Advanced", 3GPP Draft; R1-090805, 3rd Generation Partnership Project (3GPP), Mobile Competence Centre; 650, Routedes Lucioles; F-06921 Sophiaantipolis Cedex; France, No. Athens, Greece; Feb. 3, 2009, XP050318661, [retrieved on Feb. 3, 2009].
090805, 3rd Generation Partnership Project (3GPP), Mobile Competence Centre; 650, Routedes Lucioles; F-06921 Sophia-Antipolis Cedex; France, No. Athens, Greece; 20090203; Feb. 3, 2009, XP050318661, [retrieved on Feb. 3, 2009].
Taiwan Search Report—TW100104193—TIPO—Aug. 19, 2013.
Siemens, "Re—Introduction of Closed Loop TxDiversity in combination with S-CPICH phase reference[online]", 3GPP TSG-RAN WG1#30 R1-030025, <URL:http://www.3gpp.org/ftp/tsg_ran/WG1_RL1/TSGR1_30/Docs/Zips/R1-030025zip>.

* cited by examiner

APPARATUS AND METHOD FOR ENABLING UPLINK BEAMFORMING TRANSIT DIVERSITY

CROSS-REFERENCE TO RELATED APPLICATION(S)

This application claims the benefit of U.S. Provisional Patent Application No. 61/302,056, titled "APPARATUS AND METHOD FOR ENABLING UPLINK BEAMFORMING TRANSIT DIVERSITY," filed on Feb. 5, 2010, which is expressly incorporated by reference herein in its entirety.

BACKGROUND

1. Field

Aspects of the present disclosure relate generally to wireless communication systems, and more particularly, for enabling uplink transmit diversity using one or more beamforming schemes.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and high speed packet access (HSPA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Generally, during uplink communications, two aspects may be observed, with the first being related to transmit power, while the second may be related to interference observed at a Node-B (e.g. base station). With respect to the first aspect, a wireless communications device (WCD) (e.g. user equipment (UE)) may be limited by a maximum transmit power and as such a limited maximum correlated data transmission rate. With respect to the second aspect, interference caused by other users may limit system capacity.

Thus, improved apparatus and methods for reducing transmit power used for a given data rate and for mitigating interference to cells other than a serving cell are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described for enabling uplink transmit diversity using one or more beamforming schemes. According to one aspect, a method for enabling uplink beamforming transmit diversity is provided. The method can include receiving, by a wireless communications device (WCD), a beamforming weight vector in response to transmission by the WCD of two or more pilot channels. Further, the method can comprise applying the received beamforming weight vector to at least one of a first of the two or more pilot channels, one or more data channels, or one or more control channels. Moreover, the method can comprise transmitting, using two or more antennas, at least one of the one or more data channels or at least one of the one or more control channels, wherein the number of pilot channels is greater than or equal to the number of antennas.

Another aspect relates to a computer program product comprising a computer-readable medium. The computer-readable medium including code executable to receive a beamforming weight vector in response to transmission by a WCD of two or more pilot channels. Further, the computer-readable medium comprises code executable to apply the received beamforming weight vector to at least one of a first of the two or more pilot channels, one or more data channels, or one or more control channels. Moreover, the computer-readable medium including code executable to transmit, using two or more antennas, at least one of the one or more data channels or at least one of the one or more control channels, wherein the number of pilot channels is greater than or equal to the number of antennas.

Yet another aspect relates to an apparatus. The apparatus can comprise means for receiving, by a WCD, a beamforming weight vector in response to transmission by the WCD of two or more pilot channels. Further, the apparatus can comprise means for applying the received beamforming weight vector to at least one of a first of the two or more pilot channels, one or more data channels, or one or more control channels. Moreover, the apparatus can comprise means for transmitting, using two or more antennas, at least one of the one or more data channels or at least one of the one or more control channels, wherein the number of pilot channels is greater than or equal to the number of antennas.

Another aspect relates to an apparatus. The apparatus can include a processor, configured for receiving a beamforming weight vector in response to transmission by the WCD of two or more pilot channels, applying the received beamforming weight vector to at least one of a first of the two or more pilot channels, one or more data channels, or one or more control channels, and transmitting, using two or more antennas, at least one of the one or more data channels or at least one of the one or more control channels, wherein the number of pilot channels is greater than or equal to the number of antennas. Further, the apparatus can include a memory coupled to the processor for storing data.

Still another aspect relates to an apparatus. The apparatus can include a receiver for receiving a beamforming weight vector in response to transmission by the WCD two or more pilot channels. Further, the apparatus can include a beamforming vector module for applying the received beamforming weight vector to at least one of a first of the two or more pilot channels, one or more data channels, or one or more control channels. Moreover, the apparatus can include a transmitter for transmitting, using two or more antennas, at least one of the one or more data channels or at least one of the one or more control channels, wherein the number of pilot channels is greater than or equal to the number of antennas.

According to another aspect, a method for generating a beamforming weight vector is provided. The method can comprise receiving, from a wireless communication device, two or more pilot channel signals. Further, the method can comprise determining a beamforming weight vector to maximize a signal to noise ratio for a first of the two or more pilot channels. Moreover, the method can comprise transmitting the determined beamforming weight vector to the WCD.

Another aspect relates to a computer program product comprising a computer-readable medium. The computer-readable medium including code executable to receive, from a wireless communication device, two or more pilot channel signals. Further, the computer-readable medium comprises code executable to determine a beamforming weight vector to maximize a signal to noise ratio for a first of the two or more pilot channels. Moreover, the computer-readable medium including code executable to transmit the determined beamforming weight vector to the WCD.

Yet another aspect relates to an apparatus. The apparatus can comprise means for receiving, from a wireless communication device, two or more channel signals. Further, the apparatus can comprise means for determining a beamforming weight vector to maximize a signal to noise ratio for a first of the two or more pilot channels. Moreover, the apparatus can comprise means for transmitting the determined beamforming weight vector to the WCD.

Another aspect relates to an apparatus. The apparatus can include a processor, configured for a processor, configured for receiving, from a wireless communication device, two or more pilot channel signals, determining a beamforming weight vector to maximize a signal to noise ratio for a first of the two or more pilot channels, and transmitting the determined beamforming weight vector to the WCD. Further, the apparatus can include a memory coupled to the processor for storing data.

Still another aspect relates to an apparatus. The apparatus can include a receiver operable for receiving, from a wireless communication device, two or more pilot channel signals. Further, the apparatus can include a beamforming vector module operable for determining a beamforming weight vector to maximize a signal to noise ratio for a first of the two or more pilot channels. Moreover, the apparatus can include a transmitter operable for transmitting the determined beamforming weight vector to the WCD.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
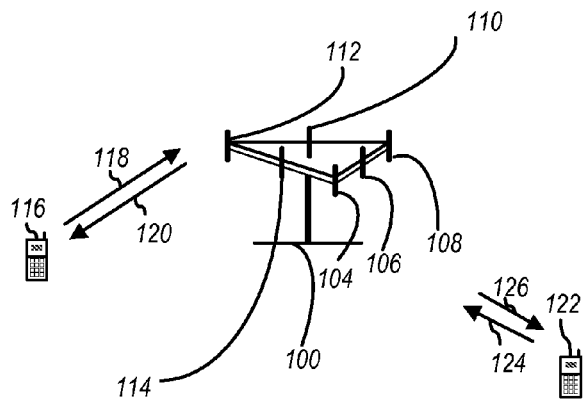
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
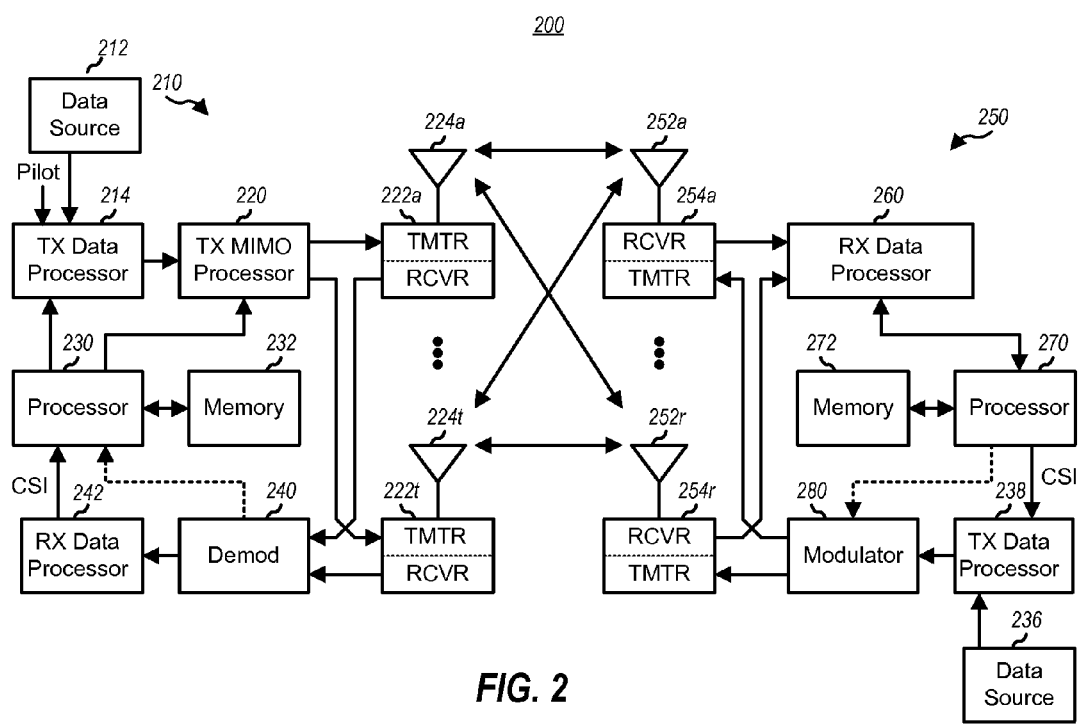
FIG. 2 illustrates a block diagram of a communication system.

FIG. 2 is a block diagram of an embodiment of a transmitter system 210 (also known as the access point) and a receiver system 250 (also known as access terminal) in a MIMO system 200. In one aspect, system 200 may be used to implement one or more mobile transmit diversity schemes. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
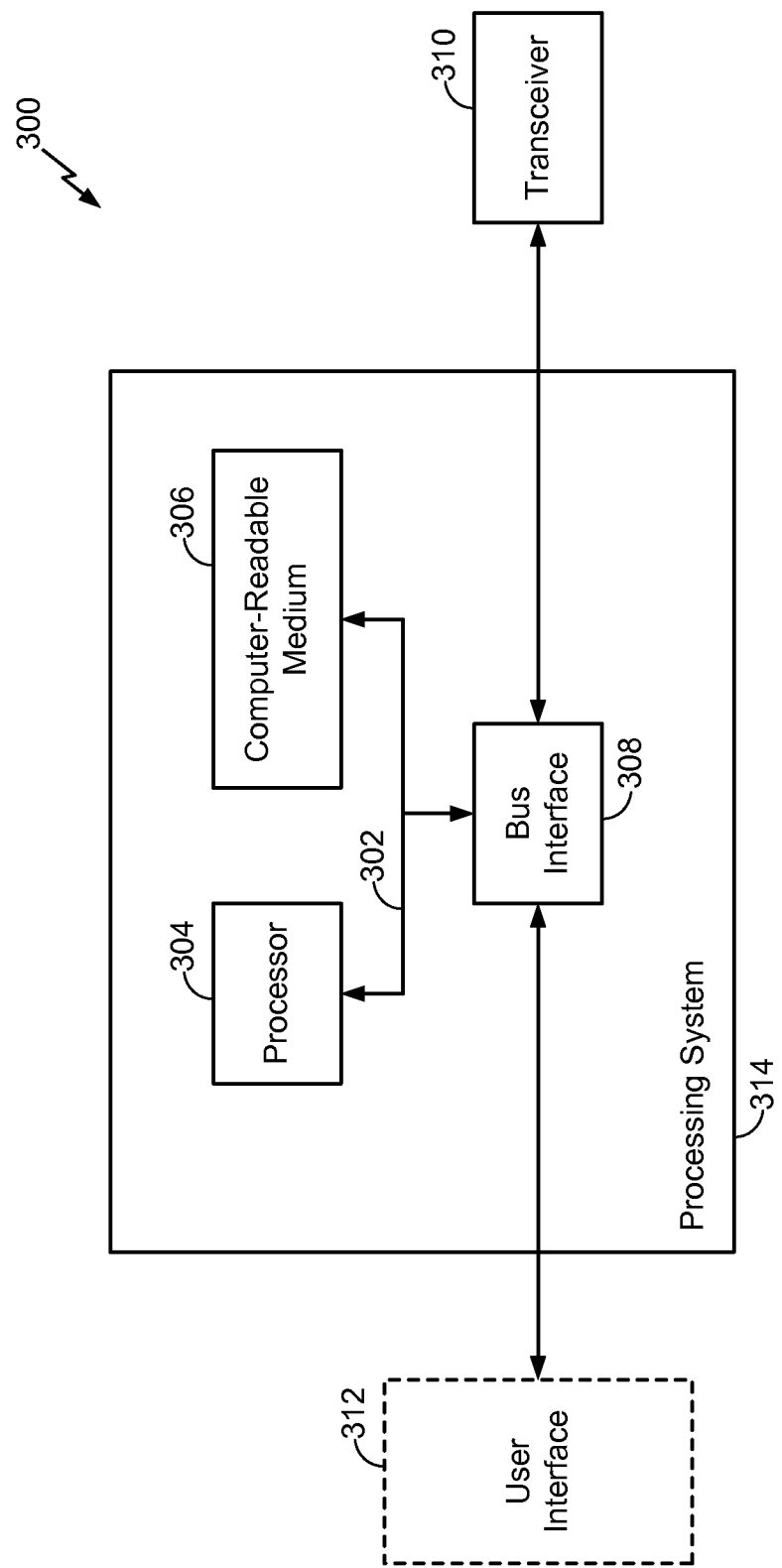
FIG. 3 is a diagram illustrating an example of a hardware implementation for an apparatus employing a processing system.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCHMBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 3 is a conceptual diagram illustrating an example of a hardware implementation for an apparatus 300 employing a processing system 314. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

Further, processor 304 can provide means for receiving, by a WCD, a beamforming weight vector in response to transmission by the WCD of two or more pilot channels, means for applying the received beamforming weight vector to at least one of a first of the two or more pilot channels, one or more data channels, or one or more control channels, and means for means for transmitting, using two or more antennas, at least one of the one or more data channels or at least one of the one or more control channels, wherein the number of pilot channels is greater than or equal to the number of antennas. In one aspect, processor 304 may further provide means for deriving a second beamforming weight vector from the received beamforming weight vector, means for applying the derived second beamforming weight vector to a second of the two or more pilot channels, means for transmitting the first of the two or more pilot channels with the received beamforming weight vector using the two or more antennas, and means for transmitting the second of the two or more pilot channels with the derived second beamforming weight vector using the two or more antennas. In such an aspect, a virtual antenna may be defined as a vector channel corresponding to the weight factor. In another aspect, processor 304 may further provide means for transmitting the first of the two or more pilot channels using a first antenna of the two or more antennas, and means for transmitting a second of the two or more pilot channels using a second antenna of the two or more antennas. In another aspect, processor 304 may further provide means for transmitting the first of the two or more pilot channels with the received beamforming weight vector using the two or more antennas, and means for transmitting a second of the two or more pilot channels using a second of the two or more antennas. In another aspect, processor 304 may further provide means for applying the received beamforming weight vector to a third of the one or more pilot channel, means for transmitting the third of the two or more pilot channels with the received beamforming weight vector using the two or more antennas, means for transmitting the first of the two or more pilot channels using a first antenna of the two or more antennas, and means for transmitting a second of the two or more pilot channels using a second of the two or more antennas. In another aspect, processor 304 may further provide means for receiving a power control value for the first of the two or more pilot channels, and means for deriving a second power control value for a second of the two or more pilot channels from the received power control value.

In another aspect, processor 304 may provide means for means for receiving, from a wireless communication device, two or more pilot channel signals, means for determining a beamforming weight vector to maximize a signal to noise ratio for a first of the two or more pilot channels, and means for transmitting the determined beamforming weight vector to the WCD.

Figure 4:
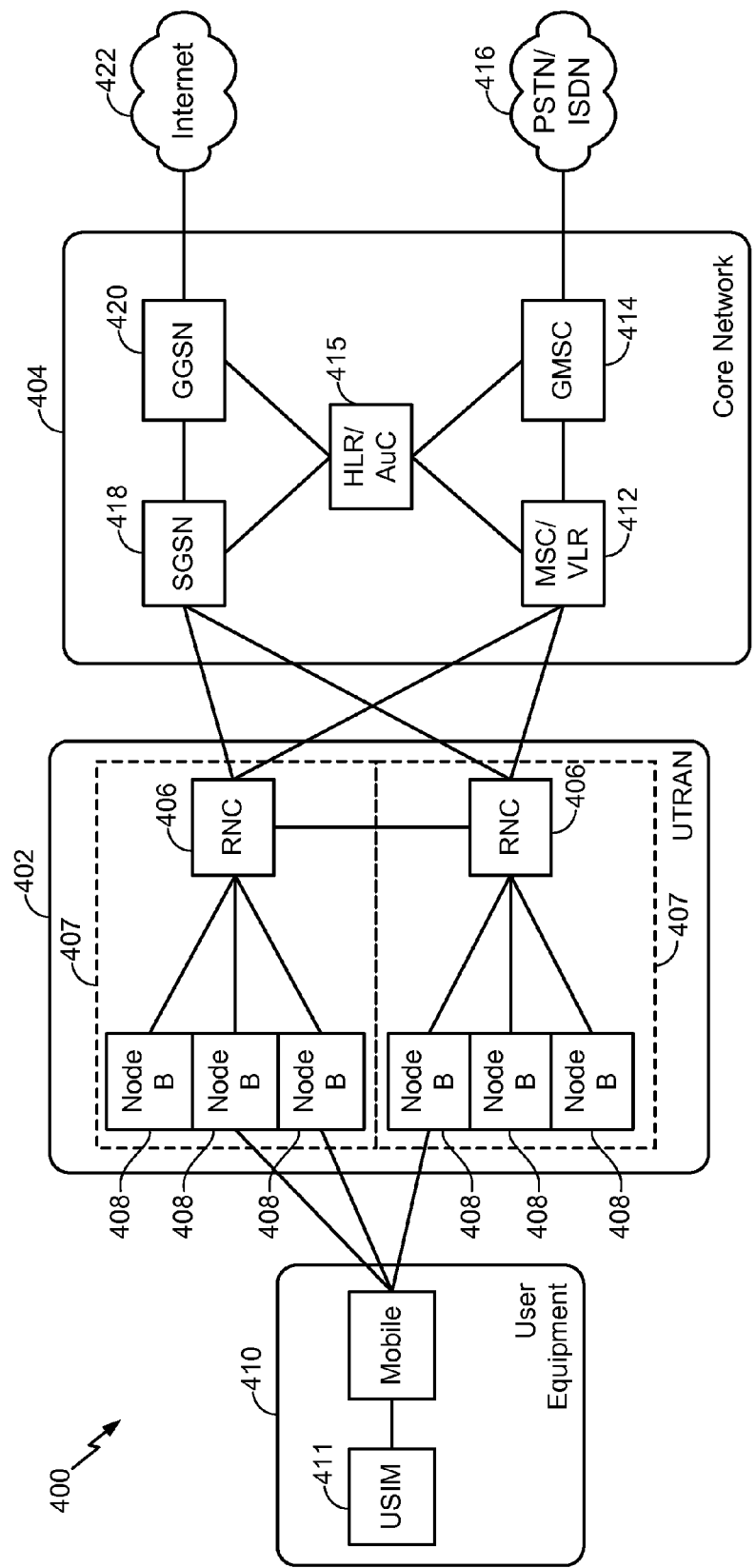
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface. A UMTS network includes three interacting domains: a Core Network (CN) 404, a UMTS Terrestrial Radio Access Network (UTRAN) 402, and User Equipment (UE) 410. In this example, the UTRAN 402 provides various wireless services including telephony, video, data, messaging, broadcasts, and/or other services. The UTRAN 402 may include a plurality of Radio Network Subsystems (RNSs) such as RNS 407, each including a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. Moreover, certain applications may utilize femtocells served by a home Node B (HNB), home enhanced Node B (HeNB), femto access point (FAP), access point base station, etc. For clarity, in the illustrated example, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The downlink (DL), also called the forward link, refers to the communication link from a Node B 408 to a UE 410, and the uplink (UL), also called the reverse link, refers to the communication link from a UE 410 to a Node B 408.

The CN domain 404 interfaces with one or more access networks, such as the UTRAN 402. As shown, the core network 404 is a GSM core network. However, as those skilled in the art will recognize, the various concepts presented throughout this disclosure may be implemented in a RAN, or other suitable access network, to provide UEs with access to types of core networks other than GSM networks.

The core network 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a visitor location register (VLR) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The core network 404 also supports packet-data services with SGSN 418 and a GGSN 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the UL and DL between a Node B 408 and a UE 410. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Generally, during communications between devices, closed loop transmit diversity (CLTD) beamforming may be used to improve data rates while using less transmit power. Multiple beamforming schemes are described herein through example aspects. In all these schemes, UE transmitter may apply a precoding (e.g. beamforming) vector over multiple transmit antennas so that the signals from the transmit antennas received at a Node B may be constructively added. Such constructive addition may assist to maximize a Node B receiver signal to noise ratio (SNR), therefore achieve a beamforming effect. The CLTD beamforming schemes described herein may allow users to experience increased uplink data rates, and/or reduced transmit power, therefore improving uplink coverage range. Further, the schemes described herein may reduce interference to cells other than a serving cell.

Figure 5:
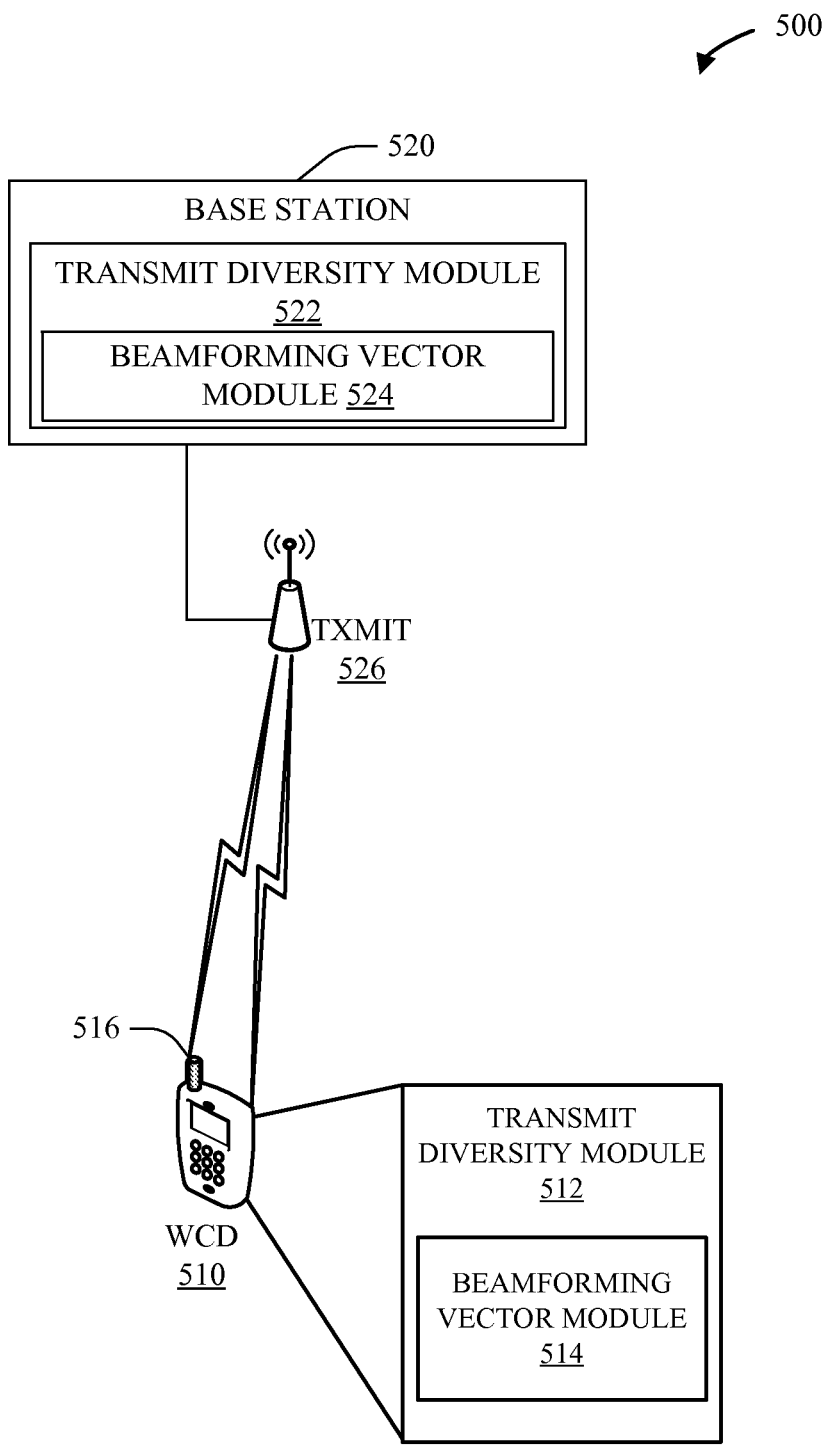
FIG. 5 is a block diagram of a system for structuring and conducting communications in a wireless communication system according to an aspect.

With reference now to FIG. 5, a block diagram of a wireless communication system 500 for enabling uplink transmit diversity using one or more beamforming is illustrated. System 500 may include one or more base stations 520 and one or more wireless communications device (e.g. terminals, UEs) 510, which can communicate via respective antennas 526 and 516. In one aspect, base station 520 may function as an E-NodeB. Further, base station 520 may include transmit diversity module 522 which may be operable to implement one or more transmit diversity schemes. Still further, transmit diversity module 522 may include beamforming vector module 524 which may be operable to generate beamforming weight vectors to enabling uplink transmit diversity with beamforming. In one aspect, UE 510 may include transmit diversity module 512 which may be operable to implement one or more transmit diversity schemes. Further, transmit diversity module 512 may include beamforming vector module 514 which may be operable to enable beamforming using one or more received beamforming weight vectors.

In one aspect, base station 520 may conduct a DL communication to terminal 510 via transceivers and antennas 526. At the UE 510, the DL communication may be received via antennas 516 and transceivers. In one aspect, the DL communication information may include a beamforming weight vector. In another aspect, terminal 510 may conduct a UL communication to base station 520 via transceivers and antennas 516. At the base station 520, the UL communication may be received via antennas 526 and transceivers. In one aspect, information communicated from UE 510 to base station 520 may be transmitted using the beamforming weight vector.

In operation, a closed loop uplink transmission scheme to enable beamforming may include UE 510 transmitting multiple pilot channel signals from multiple antennas 516 to base station 520. Further, transmit diversity module 522 associated with base station 520 may receive the multiple pilot channel transmissions and estimate uplink channel values based on the received pilot channels. Beamforming vector module 524 may determine optimal phase and/or amplitude values, from the estimated uplink channel values, to maximize a received signal to noise ratio of data and control channels and a primary pilot channel if the primary pilot channel is on the same beam as the data and control channels. In one aspect the primary pilot channel is the first pilot channel. Further, beamforming vector module 524 may generate a beamforming weight vector from the determined values and may transmit the beamforming weight vector to the UE 510. In one aspect, the beamforming weight vector is transmitted using a fractional dedicated physical channel (F-DPCH). Still further, UE 510 may receive the beamforming weight vector and beamforming vector module 514 may apply the beamforming weight vector information to at least one or more data channels and one or more control channels. In one aspect, data channels may include: an enhanced dedicated physical data channel (E-DPDCH), a high speed dedicated physical data channel (HS-DPDCHs), a R99 dedicated physical data channels (R99-DPDCH), etc. Further, in one aspect, control channels may include: an enhanced dedicated physical control channel (E-DPCCH), etc. Further, two or more pilot channels may be enabled using two or more DPCCH. Further, data and control channels may be transmitted on a dominant virtual antenna, various beamforming schemes may differ with respect to application of the beamforming information to the pilot channels. In one aspect, the beamforming weight vector information may also be applied to a first pilot channel. In another aspect, the beamforming weight vector information may be applied to a first pilot channel and information derived from the beamforming weight vector may be applied to a second pilot channel and/or additional pilot channels. Further, in such an aspect, additional information may be derived from the beamforming weight vector and may be applied to any number of additional pilot channels in a similar manner as information may be applied to the second pilot channel. Various schemes for applying the beamforming weight vector are described with reference to FIGS. 7-10. In one aspect, pilot channel transmissions may be time aligned.

Figure 6:
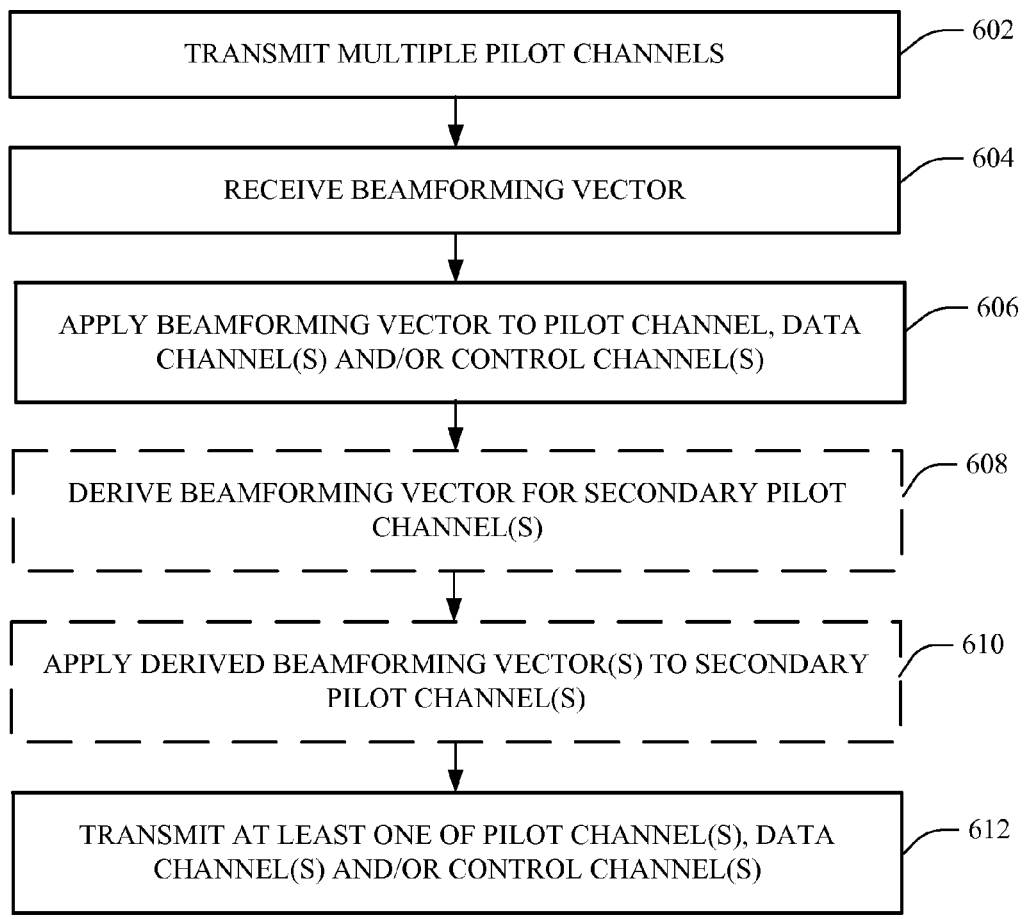
FIG. 6 is an example flow diagram of a methodology for enabling uplink transmit diversity using one or more beamforming schemes, according to an aspect.

FIG. 6 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, an example method 600 for enabling uplink transmit diversity using one or more beamforming schemes is illustrated. Generally, at reference numeral 602 a UE may transmit multiple pilot signals to a serving Node B. In one aspect, the serving Node B may determine beamforming weight information and generate a beamforming weight vector for transmission to the UE. At reference numeral 604, the UE received the determined beamforming weight vectors. In one aspect, the beamforming weight vector is received by the UE over a fractional dedicated physical channel (F-DPCH). In one aspect, the beamforming weight vector may include amplitude and/or phase information for one or more channels. In one aspect, the power control value for a primary pilot channel is received by UE over F-DPCH. In one such aspect, the UE may derive power values for additional pilot channels from the received power values. In another aspect, the power control values sent over F-DPCH may include power values for each pilot channel. At reference numeral 606, the received beamforming vector may be applied to one or more data channels and one or more control channels. In another aspect, the received beamforming weight vector may also be applied to a first pilot channel.

At reference 608, optionally, a beamforming value for two or more pilot channels other than the primary pilot channel may be derived from the received beamforming weight vector. In such an aspect, the derived beamforming information may include a phase shift such that the primary and a secondary pilot channel are orthogonal. Further, optionally, at reference numeral 610, the derived beamforming weight information may be applied to a second pilot channel. At reference numeral 612, at least data and control channels may be transmitted using the applied beamforming values over multiple antennas. In another aspect, at least the primary pilot channel may be transmitted with the beamforming information applied.

Figure 7:
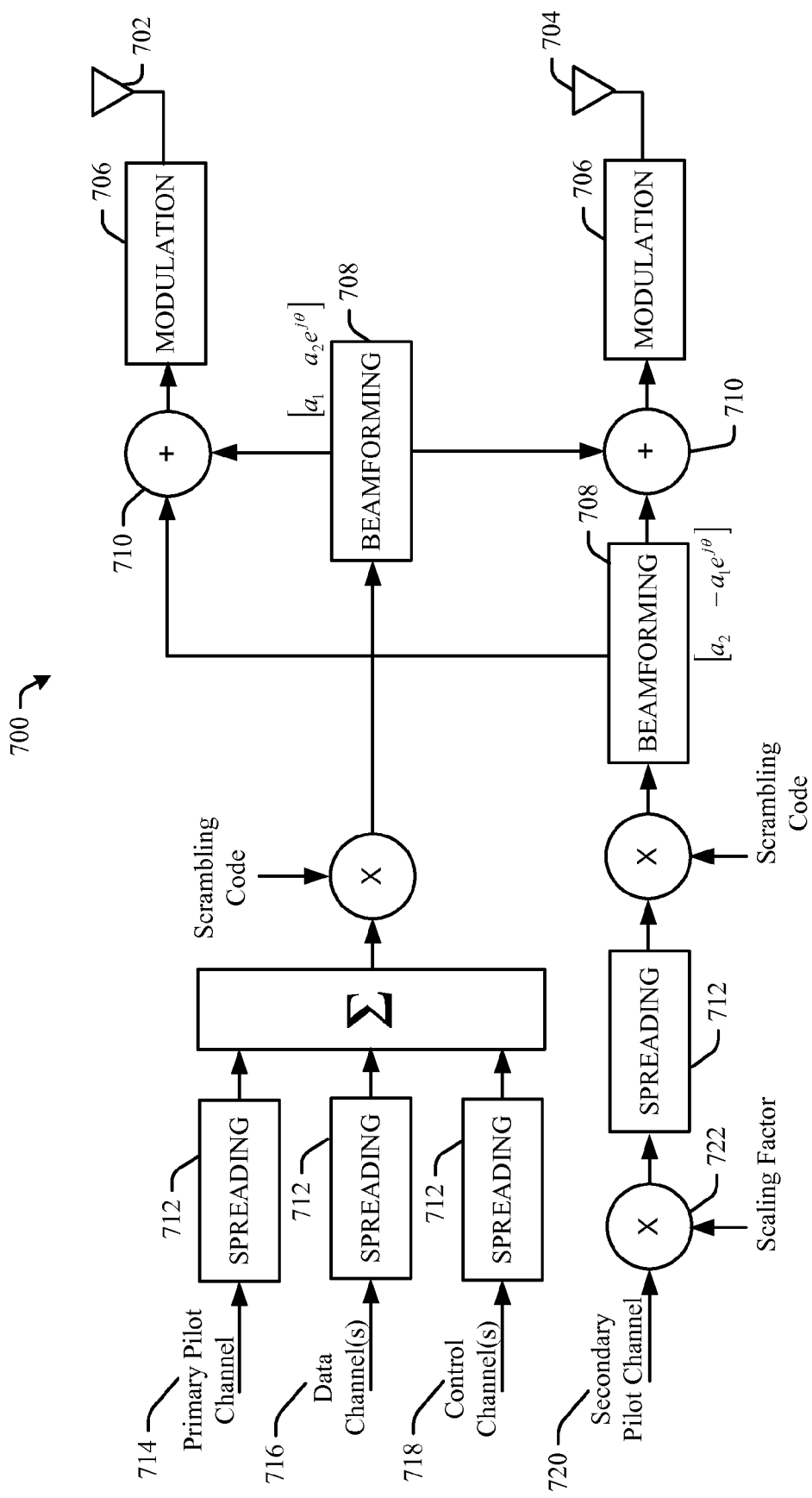
FIG. 7 is an example block diagram for implementing an uplink beamforming transmit diversity scheme, according to an aspect.

Turning now to FIG. 7 an example block diagram for implementing an uplink beamforming transmit diversity scheme is illustrated. In the depicted aspect, an example UE 700 is illustrated. UE 700 may include multiple antennas (702, 704) accessed through modulation units 706. Further, UE 700 may include one or more beamforming modules 708 operable to apply a beamforming weight vector and/or beamforming weight information derived from the beamforming weight vector. Further, spreading module 712 may apply spreading factors to various channels, such as a primary pilot channel 714, one or more data channels 716, one or more control channels 718 and a secondary pilot channel 720. In one aspect, data channels 716 may include: an enhanced dedicated physical data channel (E-DPDCH), a high speed dedicated physical data channel (HS-DPDCHs), a R99 dedicated physical data channels (R99-DPDCH), etc. Further, in one aspect, control channels 718 may include: an enhanced dedicated physical control channel (E-DPCCH), etc.

As depicted in FIG. 7, data channels 716 and control channels 718, and the primary pilot channel 714 may be transmitted on a dominant virtual antenna using a the beamforming weight vector signaled by a Node B via downlink control channel, and the secondary pilot channel 720 may be transmitted on a weaker virtual antenna. In such an aspect, a beamforming vector associated with the dominant antenna may be represented as $[a_1\ a_2 e^{j\theta}]$, where $a_1^2+a_2^2=1$, and the beamforming phase is denoted by $\theta$. In one aspect, the beamforming phase $\theta$ may be quantized into a finite set, such as $\{0, 90, 180, 270\}$ degrees. Similarly, in another aspect the amplitude variables $[a_1\ a_2]$ may belong to a finite set.

Further, scaling factor 722 may be applied to the secondary pilot channel 720. In such an aspect, to achieve a tradeoff between channel estimation, at the Node B receiver, and transmit power overhead due to the introduction of the secondary pilot channel, a non-negative scaling factor $\alpha$ 722, which is smaller than one, may be introduced.

In one aspect, a beamforming vector associated with a weaker antenna, or virtual antenna, may be represented as $[a_2\ -a_1 e^{j\theta}]$. In one aspect, the beamforming vector associated with the weaker virtual antenna may be orthogonal to the beamforming vector associated with the dominant virtual antenna.

In operation, application of the beamforming vector to a baseband signal transmitted on the first antenna 702 may be represented as: $[\beta_c x_{P1}(n)+\beta_d x_d(n)+\beta_{ec} x_{ec}(n)+\beta_{ed} x_{ed}(n)+\beta_{hs} x_{hs}(n)] \cdot a_1 \cdot s(n) + \alpha \beta_c x_{P2}(n) \cdot a_2 \cdot s(n)$, and a base band signal transmitted on a second antenna 704 may be represented as: $[\beta_c x_{P1}(n)+\beta_d x_d(n)+\beta_{ec} x_{ec}(n)+\beta_{ed} x_{ed}(n)+\beta_{hs} x_{hs}(n)] \cdot a_2 e^{j\theta} \cdot x(n) + \alpha \beta_c x_{P2}(n) \cdot (-a_1 e^{j\theta}) \cdot s(n)$ where n is the chip index and x(n) with the subscripts c, d, ec, hs, ed may represent DPCCH, DPDCH, E-DPCCH, HS-DPCCH and E-DPDCH channel, respectively. The variable β along with appropriate subscript denotes the gain factor for a particular channel, and s(n) is the scrambling sequence.

In the depicted aspect, unlike in the operation of non-transmit diversity UEs, which may use one transmit chain and one power amplifier, for a beamforming transmit diversity UE 700, there may be two transmit chains and two power amplifiers. Further, for the Node B receiver, demodulation can be done similar to a non-beamforming UE, e.g. by estimating the channel based on the primary pilot channel. This estimating ability by a non-serving Node B may aid in soft handover scenarios, since, although the non-serving Node B may not have knowledge of the beamforming vector sent by the serving cell Node B, by estimating the channel based on the primary pilot channel alone, the non-serving Node B may demodulate and decode the beamforming UE's 700 traffic and control channels.

Figure 8:
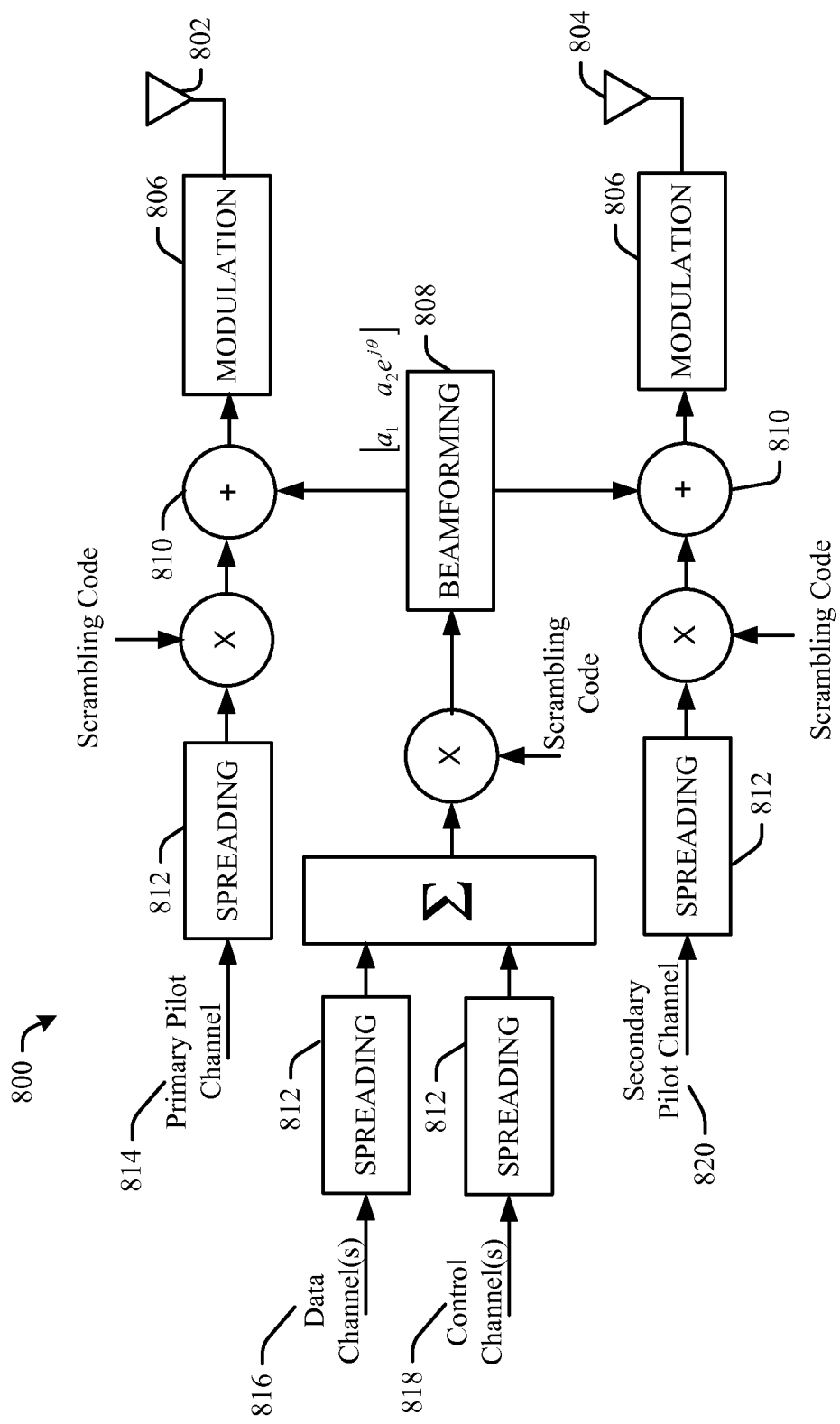
FIG. 8 is another example block diagram for implementing an uplink beamforming transmit diversity scheme, according to an aspect.

Turning now to FIG. 8 an example block diagram for implementing an uplink beamforming transmit diversity scheme is illustrated. In the depicted aspect, an example UE 800 is illustrated. UE 800 may include multiple antennas (802, 804) accessed through modulation units 806. Further, UE 800 may include one or more beamforming modules 808 operable to apply a beamforming weight vector. Further, spreading module 812 may apply spreading factors to various channels, such as a primary pilot channel 814, one or more data channels 816, one or more control channels 818 and a secondary pilot channel 820. In one aspect, data channels 816 may include: an enhanced dedicated physical data channel (E-DPDCH), a high speed dedicated physical data channel (HS-DPDCHs), a R99 dedicated physical data channels (R99-DPDCH), etc. Further, in one aspect, control channels 818 may include: an enhanced dedicated physical control channel (E-DPCCH), etc.

As depicted in FIG. 8, data channels 816 and control channels 818 may be transmitted on a dominant virtual antenna using a the beamforming weight vector signaled by a Node B via downlink control channel. In such an aspect, a beamforming vector associated with the dominant virtual antenna may be represented as $[a_1\ a_2 e^{j\theta}]$, where $a_1^2 + a_2^2 = 1$, and the beamforming phase is denoted by $\theta$. In one aspect, the beamforming phase $\theta$ may be quantized into a finite set, such as {0, 90, 180, 270} degrees. Similarly, in another aspect the amplitude variables $[a_1\ a_2]$ may belong to a finite set. In the depicted aspect, primary pilot channel 814 may be transmitted using the first antenna 802 and the second pilot channel 820 may be transmitted using the second antenna 804.

In operation, application of the beamforming vector to a baseband signal transmitted on the first antenna 702 may be represented as: $[\beta_d x_d(n) + \beta_{ec} x_{ec}(n) + \beta_{ed} x_{ed}(n) + \beta_{hs} x_{hs}(n)] \cdot a_1 \cdot s(n) + \beta_c x_{P1}(n) \cdot s(n)$, and a base band signal transmitted on a second antenna 704 may be represented as: $[\beta_d x_d(n) + \beta_{ec} x_{ec}(n) + \beta_{ed} x_{ed}(n) + \beta_{hs} x_{hs}(n)] \cdot a_2 e^{j\theta} \cdot s(n) + \beta_c x_{P2}(n) \cdot s(n)$ where n is the chip index and x(n) with the subscripts c, d, ec, hs, ed may represent DPCCH, DPDCH, E-DPCCH, HS-DPCCH and E-DPDCH channel, respectively. The variable β along with appropriate subscript denotes the gain factor for a particular channel, and s(n) is the scrambling sequence.

In the depicted aspect, unlike in the operation of non-transmit diversity UEs, which may use one transmit chain and one power amplifier, for a beamforming transmit diversity UE 700, there may be two transmit chains and two power amplifiers. Further, for a serving Node B receiver, for the purpose of demodulation, in order to estimate a composite channel response seen by the data and control channels, the serving Node B receiver may first estimate the channels between each of the physical antennas (802, 804) of the beamforming UE 800 and the receive antennas of the Node B, based on the two pilot channels (814, 820). After that, the serving Node B receiver may synthesize a composite channel based on the beamforming vector that was applied to the data and control channels. In such an aspect, the non-serving Node B may have no knowledge of the beamforming vector sent by the serving Node B and thus may not be able to demodulate the UE's data and control channels.

Figure 9:
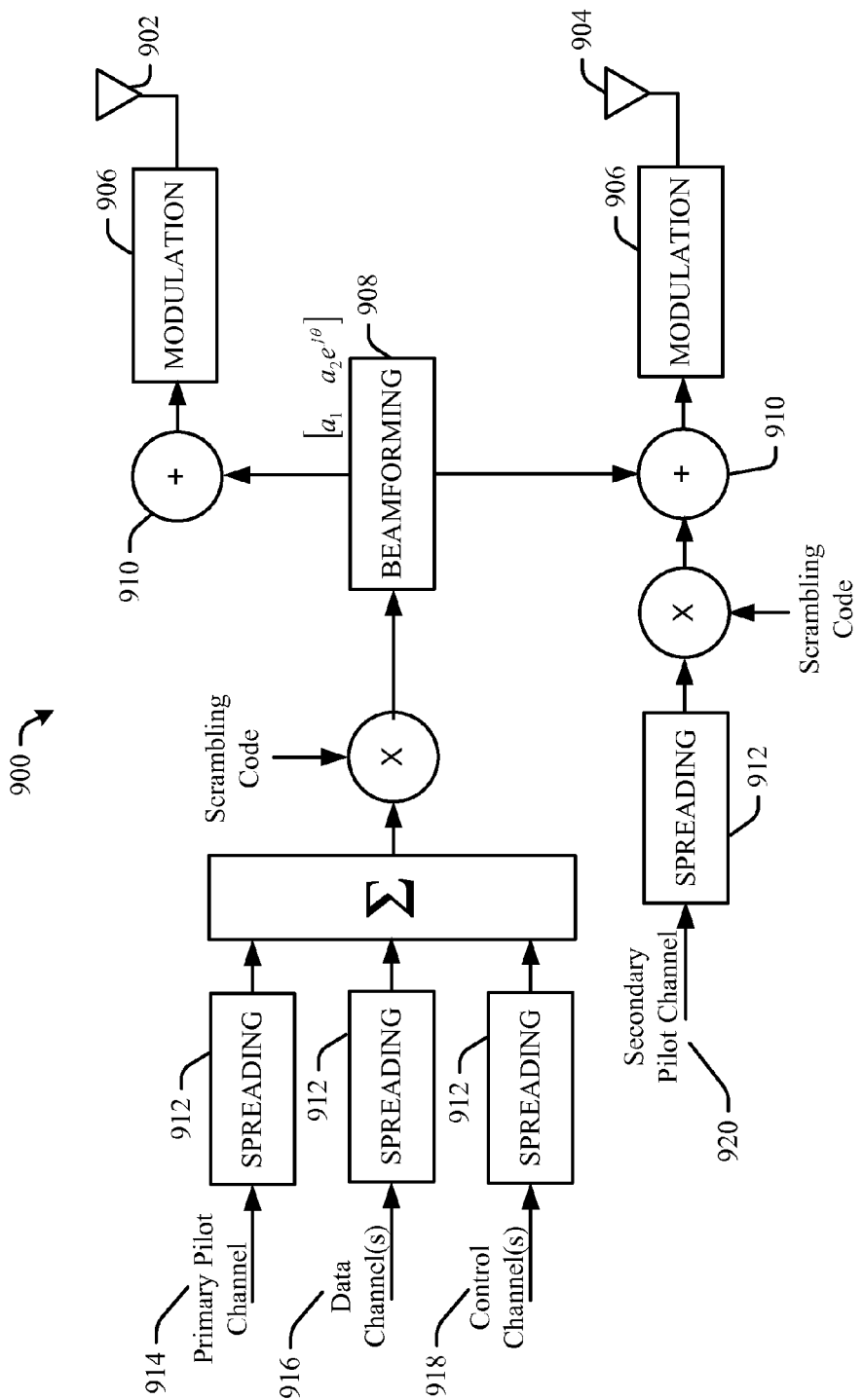
FIG. 9 depicts still another exemplary block diagram for implementing an uplink beamforming transmit diversity scheme according to an aspect.

Turning now to FIG. 9 an example block diagram for implementing an uplink beamforming transmit diversity scheme is illustrated. In the depicted aspect, an example UE 900 is illustrated. UE 900 may include multiple antennas (902, 904) accessed through modulation units 906. Further, UE 900 may include one or more beamforming modules 908 operable to apply a beamforming weight vector. Further, spreading module 912 may apply spreading factors to various channels, such as a primary pilot channel 914, one or more data channels 916, one or more control channels 918 and a secondary pilot channel 920. In one aspect, data channels 916 may include: an enhanced dedicated physical data channel (E-DPDCH), a high speed dedicated physical data channel (HS-DPDCHs), a R99 dedicated physical data channels (R99-DPDCH), etc. Further, in one aspect, control channels 918 may include: an enhanced dedicated physical control channel (E-DPCCH), etc.

As depicted in FIG. 9, data channels 916 and control channels 918, and the primary pilot channel 914 may be transmitted on a dominant virtual antenna using a the beamforming weight vector signaled by a Node B via downlink control channel, and the secondary pilot channel 920 may be transmitted on a second physical transmit antenna 904. In such an aspect, a beamforming vector associated with the dominant virtual antenna may be represented as $[a_1\ a_2 e^{j\theta}]$, where $a_1^2 + a_2^2 = 1$, and the beamforming phase is denoted by $\theta$. In one aspect, the beamforming phase $\theta$ may be quantized into a finite set, such as {0, 90, 180, 270} degrees. Similarly, in another aspect the amplitude variables $[a_1\ a_2]$ may belong to a finite set.

In operation, application of the beamforming vector to a baseband signal transmitted on the first antenna 702 may be represented as: $[\beta_c x_{P1}(n) + \beta_d x_d(n) + \beta_{ec} x_{ec}(n) + \beta_{ed} x_{ed}(n) + \beta_{hs} x_{hs}(n)] \cdot a_1 \cdot s(n)$, and a base band signal transmitted on a second antenna 704 may be represented as: $[\beta_c x_{P1}(n) + \beta_d x_d(n) + \beta_{ec} x_{ec}(n) + \beta_{ed} x_{ed}(n) + \beta_{hs} x_{hs}(n)] \cdot a_2 e^{j\theta} \cdot s(n) + \alpha \beta_c x_{P2}(n) \cdot s(n)$ where n is the chip index and x(n) with the subscripts c, d, ec, hs, ed may represent DPCCH, DPDCH, E-DPCCH, HS-DPCCH and E-DPDCH channel, respectively. The variable β along with appropriate subscript denotes the gain factor for a particular channel, and s(n) is the scrambling sequence.

In the depicted aspect, unlike in the operation of non-transmit diversity UEs, which may use one transmit chain and one power amplifier, for a beamforming transmit diversity UE 700, there may be two transmit chains and two power amplifiers. Further, for the Node B receiver, demodulation can be done similar to a non-beamforming UE, e.g. by estimating the channel based on the primary pilot channel. This estimating ability by a non-serving Node B may aid in soft handover scenarios, since, although the non-serving Node B may not have knowledge of the beamforming vector sent by the serving cell Node B, by estimating the channel based on the primary pilot channel alone, the non-serving Node B may demodulate and decode the beamforming UE's 700 traffic and control channels. Still further, in the depicted aspect, for a serving Node B to estimate the beamforming vector, the serving Node B may utilize both pilot channels to obtain the estimates of the channels between each of the transmit antennas (902, 904) of the beamforming UE 902 and the receive antennas of the Node B. In such an aspect, the estimating processing may result in a noise enhancement due to a subtraction operation.

Figure 10:
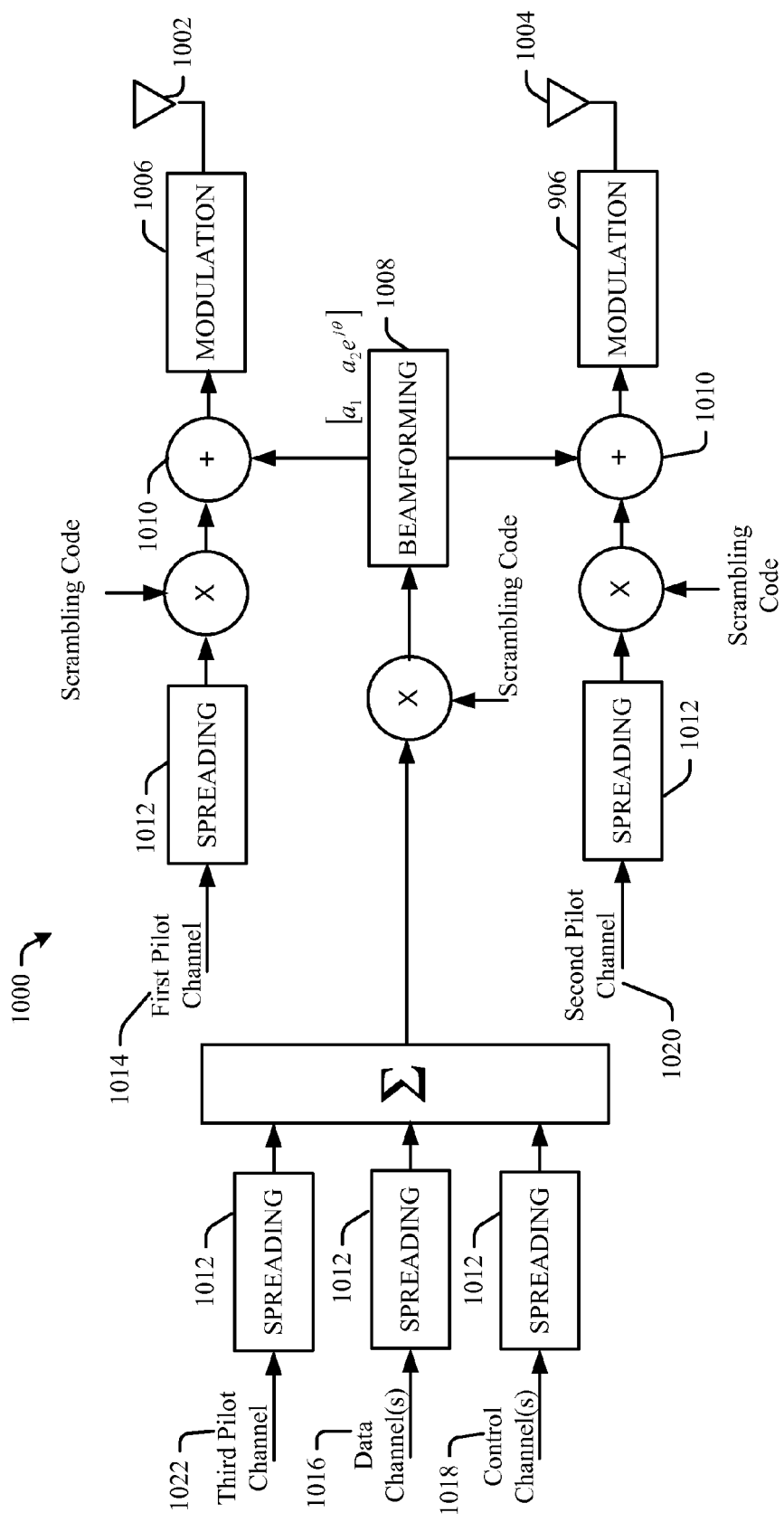
FIG. 10 is yet another example block diagram for implementing an uplink beamforming transmit diversity scheme according to an aspect.

Turning now to FIG. 10 an example block diagram for implementing an uplink beamforming transmit diversity scheme is illustrated. In the depicted aspect, an example UE 1000 is illustrated. UE 1000 may include multiple antennas (1002, 1004) accessed through modulation units 1006. Further, UE 1000 may include one or more beamforming modules 1008 operable to apply a beamforming weight vector and/or beamforming weight information derived from the beamforming weight vector. Further, spreading module 1012 may apply spreading factors to various channels, such as a primary pilot channel 1014, one or more data channels 1016, one or more control channels 1018, a secondary pilot channel 1020 and a third pilot channel 1022. In one aspect, data channels 1016 may include: an enhanced dedicated physical data channel (E-DPDCH), a high speed dedicated physical data channel (HS-DPDCHs), a R99 dedicated physical data channels (R99-DPDCH), etc. Further, in one aspect, control channels 1018 may include: an E-DPCCH, etc.

As depicted in FIG. 10, data channels 1016 and control channels 1018 and a third pilot channel 1022 may be transmitted on a dominant virtual antenna using a the beamforming weight vector signaled by a Node B via downlink control channel. In such an aspect, a beamforming vector associated with the dominant virtual antenna may be represented as $[a_1 \ a_2 e^{j\theta}]$, where $a_1^2+a_2^2=1$, and the beamforming phase is denoted by $\theta$. In one aspect, the beamforming phase $\theta$ may be quantized into a finite set, such as $\{0, 90, 180, 270\}$ degrees. Similarly, in another aspect the amplitude variables $[a_1 \ a_2]$ may belong to a finite set. In the depicted aspect, primary pilot channel 1014 may be transmitted using the first antenna 1002 and the second pilot channel 1020 may be transmitted using the second antenna 1004. As such, three pilot channels (1014, 1020, 1022) may be transmitted.

In operation, application of the beamforming vector to a baseband signal transmitted on the first antenna 302 may be represented as: $[\beta_c x_{P3}(n)+\beta_d x_d(n)+\beta_{ec} x_{ec}(n)+\beta_{ed} x_{ed}(n)+\beta_{hs} x_{hs}(n)] \cdot a_1 \cdot s(n)+\beta_c x_{P1}(n) \cdot s(n)$, and a base band signal transmitted on a second antenna 304 may be represented as: $[\beta_c x_{P3}(n)+\beta_d x_d(n)+\beta_{ec} x_{ec}(n)+\beta_{ed} x_{ed}(n)+\beta_{hs} x_{hs}(n)] \cdot a_2 e^{j\theta} \cdot s(n)+\beta_c x_{P2}(n) \cdot s(n)$ where n is the chip index and x(n) with the subscripts c, d, ec, hs, ed may represent DPCCH, DPDCH, E-DPCCH, HS-DPCCH and E-DPDCH channel, respectively. The variable $\beta$ along with appropriate subscript denotes the gain factor for a particular channel, and s(n) is the scrambling sequence.

In the depicted aspect, unlike in the operation of non-transmit diversity UEs, which may use one transmit chain and one power amplifier, for a beamforming transmit diversity UE 1000, there may be two transmit chains and two power amplifiers. Further, for the Node B receiver, demodulation can be done similar to a non-beamforming UE, e.g., by estimating the channel based on the primary pilot channel. This estimating ability by a non-serving Node B may aid in soft handover scenarios, since, although the non-serving Node B may not have knowledge of the beamforming vector sent by the serving cell Node B, by estimating the channel based on the primary pilot channel alone, the non-serving Node B may demodulate and decode the beamforming UE's 1000 traffic and control channels. To estimate the channels between the antennas of the beamforming UE and the Node B, the Node B receiver can rely on channel estimates based on the first and second pilot channels (1014, 1020).

Figure 11:
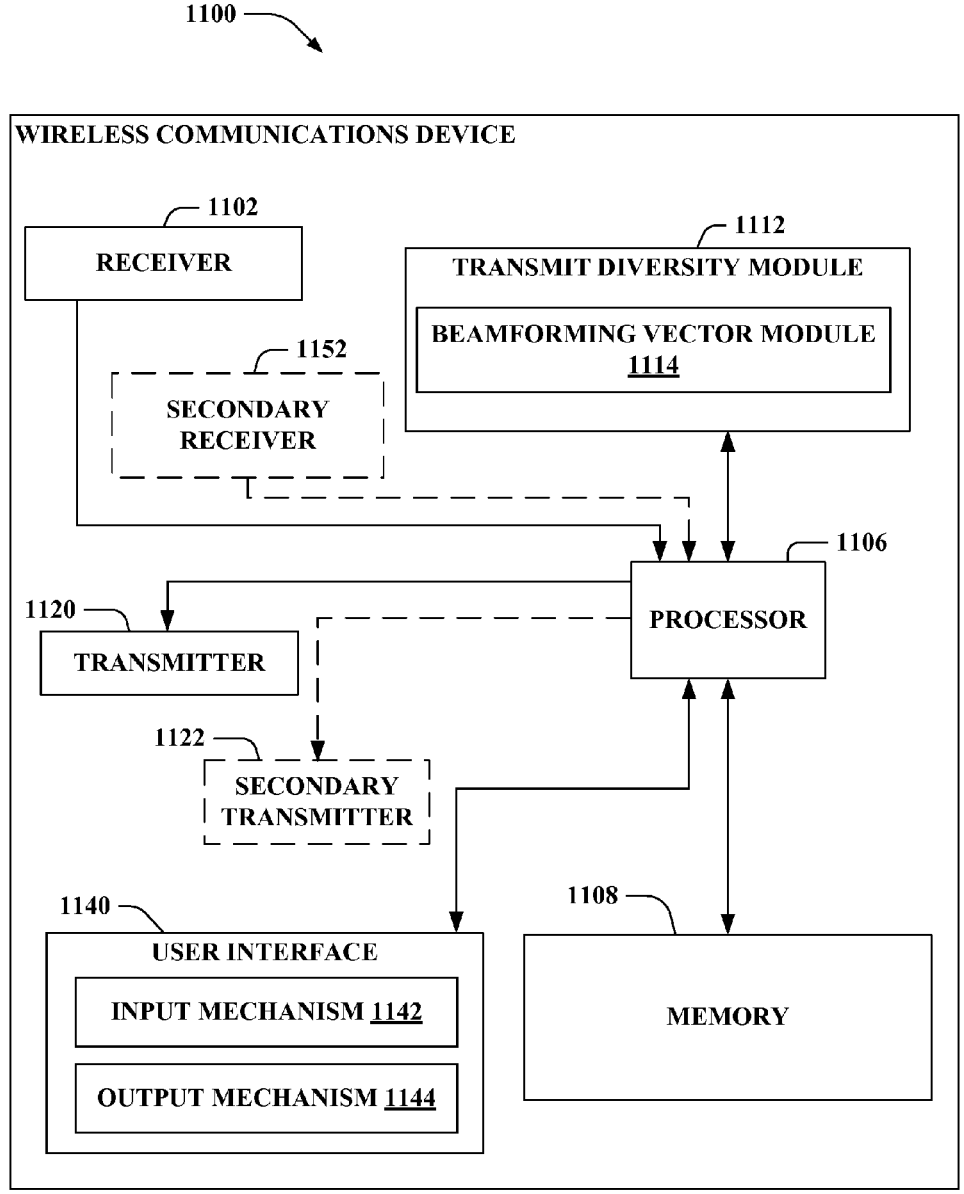
FIG. 11 is a block diagram of an example wireless communications device that can facilitate uplink transmit diversity using one or more beamforming schemes, according to an aspect.

With reference now to FIG. 11, an illustration of a wireless communications device 1100 (e.g. a client device) that enables uplink transmit diversity using one or more beamforming schemes is presented. Client device 1100 comprises receiver 1102 that receives one or more signal from, for instance, one or more receive antennas (not shown), performs typical actions on (e.g., filters, amplifies, downconverts, etc.) the received signal, and digitizes the conditioned signal to obtain samples. Receiver 1102 can comprise an oscillator that can provide a carrier frequency for demodulation of the received signal and a demodulator that can demodulate received symbols and provide them to processor 1106 for channel estimation. In one aspect, client device 1100 may further comprise secondary receiver 1152 and may receive additional channels of information.

Processor 1106 can be a processor dedicated to analyzing information received by receiver 1102 and/or generating information for transmission by one or more transmitters 1120 (for ease of illustration, only transmitter 1120 and an optional secondary transmitter 1122 are shown), a processor that controls one or more components of client device 1100, and/or a processor that both analyzes information received by receiver 1102 and/or receiver 1152, generates information for transmission by transmitter 1120 for transmission on one or more transmitting antennas (not shown), and controls one or more components of client device 1100. In one aspect, client device 1100 may further comprise secondary transmitter 1122 and may transmit additional channels of information.

Client device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1108 of the subject systems and methods is intended to comprise, without being limited to, these and any other suitable types of memory.

Client device 1100 can further comprise transmit diversity module 1112 to enable transmit diversity communications. Transmit diversity module 1112 may further include beamforming vector module 1114 to process received beamforming weight vectors and apply beamforming information to at least one of data channels, control channels, or multiple pilot channels. In one aspect, data channels may include: an E-DPDCH, a high speed dedicated physical data channel (HS-DPDCHs), a R99 dedicated physical data channels (R99-

DPDCH), etc. Further, in one aspect, control channels may include: an enhanced dedicated physical control channel (E-DPCCH), etc. Further, two or more pilot channels may be enabled using two or more DPCCH. Further, data and control channels may be transmitted on a dominant virtual antenna, various beamforming schemes may differ with respect to application the beamforming information to the pilot channels. In one aspect, the beamforming weight vector information may also be applied to a first pilot channel. In another aspect, the beamforming weight vector information may be applied to a first pilot channel and information derived from the beamforming weight vector may be applied to a second pilot channel and/or additional pilot channels.

Additionally, mobile device 1100 may include user interface 1140. User interface 1140 may include input mechanisms 1142 for generating inputs into wireless device 1100, and output mechanism 1142 for generating information for consumption by the user of wireless device 1100. For example, input mechanism 1142 may include a mechanism such as a key or keyboard, a mouse, a touch-screen display, a microphone, etc. Further, for example, output mechanism 1144 may include a display, an audio speaker, a haptic feedback mechanism, a Personal Area Network (PAN) transceiver etc. In the illustrated aspects, output mechanism 1144 may include a display operable to present media content that is in image or video format or an audio speaker to present media content that is in an audio format.

Figure 12:
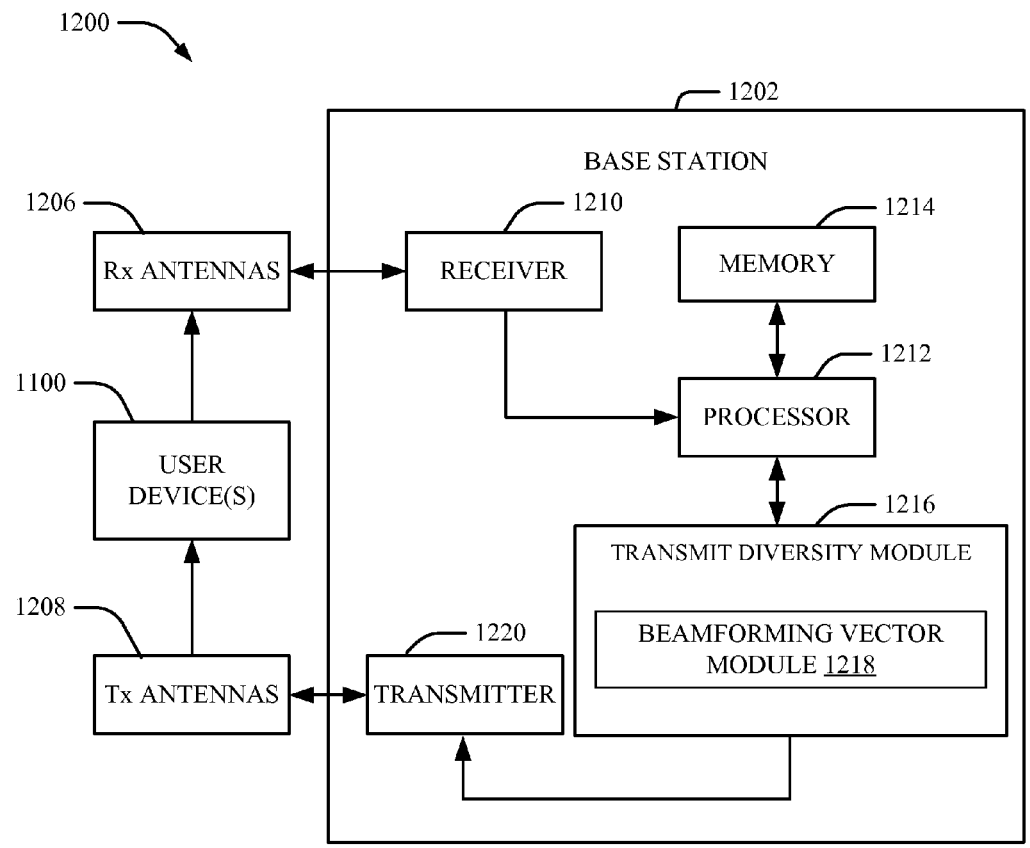
FIG. 12 is a block diagram depicting the architecture of a base station configured to enable one or more beamforming schemes, according to another aspect herein described.

With reference to FIG. 12, an example system 1200 that comprises a base station 1202 with a receiver 1210 that receives signal(s) from one or more user devices 1100, through a plurality of receive antennas 1206, and a transmitter 1220 that transmits to the one or more user devices 1100 through a plurality of transmit antennas 1208. Receiver 1210 can receive information from receive antennas 1206. Symbols may be analyzed by a processor 1212 that is similar to the processor described above, and which is coupled to a memory 1214 that stores information related to wireless data processing. Processor 1212 is further coupled to a transmit diversity module 1216 that facilitates processing signals received from transmit diversity enabled user devices 1100. In one aspect, transmit diversity module 1216 may process multiple received pilot channels from a user device 1100. In such an aspect, transmit diversity module 1216 further include beamforming vector module 1218 operable for determining optimal phase and/or amplitude values, from the estimated uplink channel values, to maximize a received signal to noise ratio of data and control channels and a primary pilot channel if the primary pilot channel is on the same beam as the data and control channels. In one aspect the primary pilot channel is the first pilot channel. Further, beamforming vector module 1218 may generate a beamforming weight vector from the determined values and may transmit the beamforming weight vector to the UE 1100. In one aspect, the beamforming weight vector is transmitted using a fractional dedicated physical channel (F-DPCH). Signals may be multiplexed and/or prepared for transmission by a transmitter 1220 through one or more transmit antennas 1208 to user devices 1100.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of enabling uplink beamforming transmit diversity, comprising:
    receiving, by a wireless communications device (WCD) having two or more antennas, a beamforming weight vector in response to a first transmission by the WCD of multiple pilot channels comprising at least a first pilot channel and a second pilot channel, wherein in the first transmission the first pilot channel and the second pilot channel are transmitted on two different antennas of the two or more antennas or on two different virtual antennas resulting from the two or more antennas;
    with respect to each of the two different antennas or the two different virtual antennas, applying the beamforming weight vector to at least one of the first pilot channel or the second pilot channel, one or more data channels, and one or more control channels, wherein the beamforming weight vector is determined based on the first transmission of the first pilot channel and the second pilot channel; and
    transmitting, by the WCD, in a second transmission using the two or more antennas, the first pilot channel, the second pilot channel, the one or more data channels, and the one or more control channels, wherein the number of the multiple pilot channels is greater than or equal to the number of the two or more antennas, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

2. The method of claim 1, further comprising:
    deriving a second beamforming weight vector from the beamforming weight vector;
    applying the beamforming weight vector to the first pilot channel and the second beamforming weight vector to the second pilot channel;
    transmitting the first pilot channel with the beamforming weight vector using the two or more antennas; and
    transmitting the second pilot channel with the second beamforming weight vector using the two or more antennas.

3. The method of claim 2, wherein the beamforming weight vector includes phase information and wherein the second beamforming weight vector is derived to be orthogonal to the beamforming weight vector.

4. The method of claim 2, wherein the transmission of the second pilot channel with the second beamforming weight vector using the two or more antennas is scaled by a non-negative scaling factor with a value less than one.

5. The method of claim 1, further comprising:
    transmitting the first pilot channel with the beamforming weight vector using the two or more antennas; and
    transmitting the second pilot channel using one of the two or more antennas.

6. The method of claim 1, further comprising:
    applying the beamforming weight vector to a third pilot channel; and
    transmitting the third pilot channel with the beamforming weight vector using the two or more antennas.

7. The method of claim 1, wherein the transmission by the WCD of the multiple pilot channels is time aligned.

8. The method of claim 1, wherein the beamforming weight vector is further determined to maximize a signal to noise ratio for a primary pilot channel on a same beam as the one or more data channels and the one or more control channels.

9. The method of claim 1, wherein the beamforming weight vector includes at least one of phase information or amplitude information.

10. The method of claim 9, wherein the phase information includes a selection of a finite set of available phases including 0 degrees, 90 degrees, 180 degrees and 270 degrees.

11. The method of claim 1, wherein the beamforming weight vector is received using a fractional dedicated physical channel.

12. The method of claim 1, further comprising:
    receiving a power control value for the first pilot channel; and
    deriving a second power control value for the second pilot channel from the power control value.

13. The method of claim 1, wherein the receiving further comprises receiving a power control value for one or more pilot channels.

14. The method of claim 1, wherein the two or more antennas are physical antennas.

15. The method of claim 1, wherein the WCD uses at least two transmit chains and at least two power amplifiers to transmit using the two or more antennas.

16. A computer program product, comprising:
    a non-transitory computer-readable medium comprising code for causing a computer to:
        receive, by a wireless communications device (WCD) having two or more antennas, a beamforming weight vector in response to a first transmission by the WCD of multiple pilot channels comprising at least a first pilot channel and a second pilot channel, wherein in the first transmission the first pilot channel and the second pilot channel are transmitted on two different antennas of the two or more antennas or on two different virtual antennas resulting from the two or more antennas;
        with respect to each of the two different antennas or the two different virtual antennas, apply the beamforming weight vector to at least one of the first pilot channel or the second pilot channel, one or more data channels, and one or more control channels, wherein the beamforming weight vector is determined based on the first transmission of the first pilot channel and the second pilot channel; and
        transmit, by the WCD, in a second transmission using the two or more antennas, the first pilot channel, the second pilot channel, the one or more data channels, and the one or more control channels, wherein the number of the multiple pilot channels is greater than or equal to the number of the two or more antennas, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

17. The computer program product of claim 16, wherein the non-transitory computer-readable medium further comprises code for causing the computer to:
    derive a second beamforming weight vector from the beamforming weight vector;
    apply the beamforming weight vector to the first pilot channel and the second beamforming weight vector to the second pilot channel;
    transmit the first pilot channel with the beamforming weight vector using the two or more antennas; and transmit the second pilot channel with the second beamforming weight vector using the two or more antennas.

18. The computer program product of claim 17, wherein the beamforming weight vector includes phase information and wherein the second beamforming weight vector is derived to be orthogonal to the beamforming weight vector.

19. The computer program product of claim 17, wherein the transmission of the second pilot channel with the second beamforming weight vector using the two or more antennas is scaled by a non-negative scaling factor with a value less than one.

20. The computer program product of claim 16, wherein the non-transitory computer-readable medium further comprises code for causing the computer to:
  transmit the first pilot channel with the beamforming weight vector using the two or more antennas; and
  transmit the second pilot channel using a one of the two or more antennas.

21. The computer program product of claim 16, wherein the non-transitory computer-readable medium further comprises code for causing the computer to:
  apply the beamforming weight vector to a third pilot channel; and
  transmit the third pilot channel with the beamforming weight vector using the two or more antennas.

22. The computer program product of claim 16, wherein the transmission by the WCD of the multiple pilot channels is time aligned.

23. The computer program product of claim 16, wherein the beamforming weight vector is further determined to maximize a signal to noise ratio for a primary pilot channel on a same beam as the one or more data channels and the one or more control channels.

24. The computer program product of claim 16, wherein the beamforming weight vector includes at least one of phase information or amplitude information.

25. The computer program product of claim 24, wherein the phase information includes a selection of a finite set of available phases including 0 degrees, 90 degrees, 180 degrees and 270 degrees.

26. The computer program product of claim 16, wherein the beamforming weight vector is received using a fractional dedicated physical channel.

27. The computer program product of claim 16, wherein the non-transitory computer-readable medium further comprises code for causing the computer to:
  receive a power control value for the first pilot channel; and
  derive a second power control value for the second pilot channel from the power control value.

28. The computer program product of claim 16, wherein the non-transitory computer-readable medium further comprises code for causing the computer to: receive a power control value for one or more pilot channels.

29. The computer program product of claim 16, wherein the two or more antennas are physical antennas.

30. The computer program product of claim 16, wherein the non-transitory computer-readable medium further comprises code for causing the computer to use at least two transmit chains and at least two power amplifiers to transmit using the two or more antennas.

31. An apparatus for enabling uplink beamforming transmit diversity, comprising:
  means for receiving, by a wireless communications device (WCD) having two or more antennas, a beamforming weight vector in response to a first transmission by the WCD of multiple pilot channels comprising at least a first pilot channel and a second pilot channel, wherein in the first transmission the first pilot channel and the second pilot channel are transmitted on two different antennas of the two or more antennas or on two different virtual antennas resulting from the two or more antennas;
  means for, with respect to each of the two different antennas or the two different virtual antennas, applying the beamforming weight vector to at least one of the first pilot channel or the second pilot channel, one or more data channels, and one or more control channels, wherein the beamforming weight vector is determined based on the first transmission of the first pilot channel and the second pilot channel; and
  means for transmitting, by the WCD, in a second transmission using the two or more antennas, the first pilot channel, the second pilot channel, the one or more data channels, and the one or more control channels, wherein the number of the multiple pilot channels is greater than or equal to the number of the two or more antennas, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

32. The apparatus of claim 31, further comprising:
  means for deriving a second beamforming weight vector from the beamforming weight vector;
  means for applying the beamforming weight vector to the first pilot channel and the second beamforming weight vector to the second pilot channel;
  means for transmitting the first pilot channel with the beamforming weight vector using the two or more antennas; and
  means for transmitting the second pilot channel with the second beamforming weight vector using the two or more antennas.

33. The apparatus of claim 32, wherein the beamforming weight vector includes phase information and wherein the second beamforming weight vector is derived to be orthogonal to the beamforming weight vector.

34. The apparatus of claim 32, wherein the transmission of the second pilot channel with the second beamforming weight vector using the two or more antennas is scaled by a non-negative scaling factor with a value less than one.

35. The apparatus of claim 31, further comprising:
  means for transmitting the first pilot channel with the beamforming weight vector using the two or more antennas; and
  means for transmitting the second pilot channel using one of the two or more antennas.

36. The apparatus of claim 31, further comprising:
  means for applying the beamforming weight vector to a third pilot channel; and
  means for transmitting the third pilot channel with the beamforming weight vector using the two or more antennas.

37. The apparatus of claim 31, wherein the transmission by the WCD of the multiple pilot channels is time aligned.

38. The apparatus of claim 31, wherein the beamforming weight vector is further determined to maximize a signal to noise ratio for a primary pilot channel on a same beam as the one or more data channels and the one or more control channels.

39. The apparatus of claim 31, wherein the beamforming weight vector includes at least one of phase information or amplitude information.

40. The apparatus of claim 39, wherein the phase information includes a selection of a finite set of available phases including 0 degrees, 90 degrees, 180 degrees and 270 degrees.

41. The apparatus of claim 31, wherein the beamforming weight vector is received using a fractional dedicated physical channel.

42. The apparatus of claim 31, further comprising:
means for receiving a power control value for the first pilot channel; and
means for deriving a second power control value for the second pilot channel from the power control value.

43. The apparatus of claim 31, wherein the means for receiving further comprises means for receiving a power control value for one or more pilot channels.

44. The apparatus of claim 31, wherein the two or more antennas are physical antennas.

45. The apparatus of claim 31, wherein the means for transmitting using the two or more antennas comprises means for using at least two transmit chains and at least two power amplifiers to transmit using the two or more antennas.

46. An apparatus operable in a wireless communication system, the apparatus comprising:
a processor, configured to
receive, by a wireless communications device (WCD) having two or more antennas, a beamforming weight vector in response to a first transmission the WCD of multiple pilot channels comprising at least a first pilot channel and a second pilot channel, wherein in the first transmission the first pilot channel and the second pilot channel are transmitted on two different antennas of the two or more antennas or on two different virtual antennas resulting from the two or more antennas,
with respect to each of the two different antennas or the two different virtual antennas, apply the beamforming weight vector to at least one of the first pilot channel or the second pilot channel, one or more data channels, and one or more control channels, wherein the beamforming weight vector is determined based on the first transmission of the first pilot channel and the second pilot channel, and
transmit, by the WCD, in a second transmission using the two or more antennas, the first pilot channel, the second pilot channel, the one or more data channels, and the one or more control channels, wherein the number of the multiple pilot channels is greater than or equal to the number of the two or more antennas, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna; and
a memory coupled to the processor for storing data.

47. The apparatus of claim 46, wherein the processor is further configured to:
derive a second beamforming weight vector from the beamforming weight vector;
apply the beamforming weight vector to the first pilot channel and the second beamforming weight vector to the second pilot channel;
transmit the first pilot channel with the received beamforming weight vector using the two or more antennas; and
transmit the second pilot channel with the second beamforming weight vector using the two or more antennas.

48. The apparatus of claim 47, wherein the beamforming weight vector includes phase information and wherein the second beamforming weight vector is derived to be orthogonal to the beamforming weight vector.

49. The apparatus of claim 47, wherein the transmission of the second pilot channel with the second beamforming weight vector using the two or more antennas is scaled by a non-negative scaling factor with a value less than one.

50. The apparatus of claim 46, wherein the processor is further configured to:
transmit the first pilot channel with the beamforming weight vector using the two or more antennas; and
transmit the second pilot channel using one of the two or more antennas.

51. The apparatus of claim 46, wherein the processor is further configured to:
apply the beamforming weight vector to a third pilot channel; and
transmit the third pilot channel with the beamforming weight vector using the two or more antennas.

52. The apparatus of claim 46, wherein the transmission by the WCD of the multiple pilot channels is time aligned.

53. The apparatus of claim 46, wherein the beamforming weight vector is further determined to maximize a signal to noise ratio for a primary pilot channel on a same beam one or more data channels and the one or more control channels.

54. The apparatus of claim 46, wherein the beamforming weight vector includes at least one of phase information or amplitude information.

55. The apparatus of claim 54, wherein the phase information includes a selection of a finite set of available phases including 0 degrees, 90 degrees, 180 degrees and 270 degrees.

56. The apparatus of claim 46, wherein the beamforming weight vector is received using a fractional dedicated physical channel.

57. The apparatus of claim 46, wherein the processor is further configured to:
receive a power control value for the first pilot channel; and
derive a second power control value for the second pilot channel from the received power control value.

58. The apparatus of claim 46, wherein the processor is further configured to receive a power control value for one or more pilot channels.

59. The apparatus of claim 46, wherein the two or more antennas are physical antennas.

60. The apparatus of claim 46, wherein the processor is further configured to use at least two transmit chains and at least two power amplifiers to transmit using the two or more antennas.

61. A wireless communications device (WCD) having two or more antennas, comprising:
a receiver operable for receiving a beamforming weight vector in response to a first transmission by the WCD of multiple pilot channels comprising at least a first pilot channel and a second pilot channel, wherein in the first transmission the first pilot channel and the second pilot channel are transmitted on two different antennas of the two or more antennas or on two different virtual antennas resulting from the two or more antennas;
a beamforming vector module for, with respect to each of the two different antennas or the two different virtual antennas, applying the beamforming weight vector to at least one of the first pilot channel or the second pilot channel, one or more data channels, and one or more control channels, wherein the beamforming weight vector is determined based on the first transmission of the first pilot channel and the second pilot channel; and a transmitter operable for transmitting, in a second transmission using the two or more antennas, the first pilot channel, the second pilot channel, the one or more data channels, and the one or more control channels, wherein the number of the multiple pilot channels is greater than or equal to the number of the two or more antennas, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

62. The WCD of claim 61, wherein the beamforming vector module is further operable for:
deriving a second beamforming weight vector from the beamforming weight vector; and
applying the beamforming weight vector to the first pilot channel and the second beamforming weight vector to the second pilot channel;
wherein the transmitter is further operable for:
transmitting the first pilot channel with the beamforming weight vector using the two or more antennas; and
transmitting the second pilot channel with the second beamforming weight vector using the two or more antennas.

63. The WCD of claim 62, wherein the received beamforming weight vector includes phase information and wherein the second beamforming weight vector is derived to be orthogonal to the beamforming weight vector.

64. The WCD of claim 62, wherein the transmission of the second pilot channel with the second beamforming weight vector using the two or more antennas is scaled by a non-negative scaling factor with a value less than one.

65. The WCD of claim 61, wherein the transmitter is further operable for:
transmitting the first pilot channel with the beamforming weight vector using the two or more antennas; and
transmitting the second pilot channel using one of the two or more antennas.

66. The WCD of claim 61, wherein the beamforming vector module is further operable for applying the beamforming weight vector to a third pilot channel, and wherein the transmitter is further operable for:
transmitting the third pilot channel with the beamforming weight vector using the two or more antennas.

67. The WCD of claim 61, wherein the transmission by the WCD of the multiple pilot channels is time aligned.

68. The WCD of claim 61, wherein the beamforming weight vector is further determined to maximize a signal to noise ratio for a primary pilot channel on a same beam as the one or more data channels and the one or more control channels.

69. The WCD of claim 61, wherein the beamforming weight vector includes at least one of phase information or amplitude information.

70. The WCD of claim 69, wherein the phase information includes a selection of a finite set of available phases including 0 degrees, 90 degrees, 180 degrees and 270 degrees.

71. The WCD of claim 61, wherein the beamforming weight vector is received using a fractional dedicated physical channel.

72. The WCD of claim 61, wherein the receiver is further operable for receiving a power control value for the first pilot channel and wherein the beamforming vector module is further operable for deriving a second power control value for the second pilot channel from the power control value.

73. The WCD of claim 61, wherein the receiver is further operable for receiving a power control value for one or more pilot channels.

74. The WCD of claim 61, wherein the two or more antennas are physical antennas.

75. The WCD of claim 61, wherein the transmitter is further operable for using at least two transmit chains and at least two power amplifiers to transmit using the two or more antennas.

76. A method for generating a beamforming weight vector, comprising:
receiving a first transmission from a wireless communication device (WCD) having two or more antennas, the first transmission comprising two or more pilot channels comprising a first pilot channel and a second pilot channel, wherein in the first transmission the first pilot channel and the second pilot channel are transmitted on two different antennas of the two or more antennas or on two different virtual antennas resulting from the two or more antennas;
with respect to each of the two different antennas or the two different virtual antennas, determining a beamforming weight vector based on the first transmission of the first pilot channel and the second pilot channel;
transmitting the beamforming weight vector to the WCD; and
receiving a second transmission from the WCD using the two or more antennas, the second transmission comprising the first pilot channel, the second pilot channel, one or more data channels, and one or more control channels from the WCD, wherein the beamforming weight vector is applied to at least one of the first pilot channel or the second pilot channel, the one or more data channels, and the one or more control channels, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

77. The method of claim 76, further comprising determining the beamforming weight vector to maximize a signal to noise ratio for a primary pilot channel that is transmitted on a same beam as the one or more data channels and the one or more control channels.

78. A computer program product, comprising:
a non-transitory computer-readable medium comprising code for causing a computer to:
receive a first transmission from a wireless communication device (WCD) having two or more antennas, the first transmission comprising two or more pilot channels comprising a first pilot channel and a second pilot channel, wherein in the first transmission the first pilot channel and the second pilot channel are transmitted on two different antennas of the two or more antennas or on two different virtual antennas resulting from the two or more antennas;
with respect to each of the two different antennas or the two different virtual antennas, determine a beamforming weight vector based on the first transmission of the first pilot channel and the second pilot channel;
transmit the beamforming weight vector to the WCD; and
receive a second transmission from the WCD using the two or more antennas, the second transmission comprising the first pilot channel, the second pilot channel, one or more data channels, and one or more control channels from the WCD, wherein the beamforming weight vector is applied to at least one of the first pilot channel or the second pilot channel, the one or more data channels and the one or more control channels, and wherein, in the second transmission, the one or more data channels, the one or more control channels, and the first pilot channel are transmitted using a first antenna and the second pilot channel is transmitted using a second antenna wherein the first antenna is a dominant antenna and the second antenna is a weaker antenna.

79. The computer program product of claim 78, wherein the code further causes the computer to determine the beamforming weight vector to maximize a signal to noise ratio for a primary pilot channel that is transmitted on a same beam as the one or more data channels and the one or more control channels.

80. An apparatus, comprising:
means for receiving a first transmission from a wireless communication device (WCD) having two or more antennas, the first transmission comprising two or more pilot channels comprising a first pilot channel and a second pilot channel, wherein in the first transmission the first pilot channel and the second pilot channel are transmitted on two different antennas of the two or more antennas or on two different virtual antennas resulting from the two or more antennas;
means for, with respect to each of the two different antennas or the two different virtual antennas, determining a beamforming weight vector based on the first transmission of the first pilot channel and the second pilot channel;
means for transmitting the beamforming weight vector to the WCD; and
means for receiving a second transmission from the WCD using the two or more antennas, the second transmission comprising the first pilot channel, the second pilot channel, one or more data channels, and one or more control channels from the WCD, wherein the beamforming weight vector is applied to at least one of the first pilot channel or the second pilot channel, the one or more data channels, and the one or more control channels, and wherein, in the second transmission, the one or more data channels, the one or more control channels, and the first pilot channel are transmitted using a first antenna and the second pilot channel is transmitted using a second antenna, wherein the first antenna is a dominant antenna and the second antenna is a weaker antenna.

81. The apparatus of claim 80, wherein the means for determining the beamforming weight vector further determines the beamforming weight vector to maximize a signal to noise ratio for a primary pilot channel that is transmitted on a same beam as the one or more data channels and the one or more control channels.

82. An apparatus operable in a wireless communication system, the apparatus comprising:
a processor, configured for
receiving a first transmission from a wireless communication device (WCD) having two or more antennas, the first transmission comprising two or more pilot channels comprising a first pilot channel and a second pilot channel, wherein in the first transmission the first pilot channel and the second pilot channel are transmitted on two different antennas of the two or more antennas or on two different virtual antennas resulting from the two or more antennas,
with respect to each of the two different antennas or the two different virtual antennas, determining a beamforming weight vector based on the first transmission of the first pilot channel and the second pilot channel,
transmitting the determined beamforming weight vector to the WCD, and
receiving a second transmission from the WCD using the two or more antennas, the second transmission comprising the first pilot channel, the second pilot channel, one or more data channels, and one or more control channels from the WCD, wherein the beamforming weight vector is applied to at least one of the first pilot channel or the second pilot channel, the one or more data channels, and the one or more control channels, and wherein, in the second transmission, the one or more data channels, the one or more control channels and the first pilot channel are transmitted using a first antenna and the second pilot channel is transmitted using a second antenna, wherein the first antenna is a dominant antenna and the second antenna is a weaker antenna; and
a memory coupled to the processor for storing data.

83. The apparatus of claim 82, wherein the processor is further configured for determining the beamforming weight vector to maximize a signal to noise ratio for a primary pilot channel that is transmitted on a same beam as the one or more data channels and the one or more control channels.

84. A base station, comprising:
a receiver operable for receiving a first transmission from a wireless communication device (WCD) having two or more antennas, the first transmission comprising two or more pilot channels comprising a first pilot channel and a second pilot channel, wherein in the first transmission the first pilot channel and the second pilot channel are transmitted on two different antennas of the two or more antennas or on two different virtual antennas resulting from the two or more antennas;
a beamforming vector module operable for, with respect to each of the two different antennas or the two different virtual antennas, determining a beamforming weight vector based on the first transmission of the first pilot channel and the second pilot channel; and
a transmitter operable for transmitting the determined beamforming weight vector to the WCD;
wherein the receiver is further operable for receiving a second transmission from the WCD using the two or more antennas, the second transmission comprising the first pilot channel, the second pilot channel, one or more data channels, and one or more control channels from the WCD, wherein the beamforming weight vector is applied to at least one of the first pilot channel or the second pilot channel, the one or more data channels and the one or more control channels, and wherein, in the second transmission, the one or more data channels, the one or more control channels and the first pilot channel are transmitted using a first antenna and the second pilot channel is transmitted using a second antenna, wherein the first antenna is a dominant antenna and the second antenna is a weaker antenna.

85. The base station of claim 84, wherein the beamforming vector module is further operable for determining the beamforming weight vector to maximize a signal to noise ratio for a primary pilot channel on a same beam as the one or more data channels and the one or more control channels.

* * * * *